US011686813B2

(12) United States Patent
Lee

(10) Patent No.: US 11,686,813 B2
(45) Date of Patent: Jun. 27, 2023

(54) FREE-SPACE POLARIZATION ADAPTER

(71) Applicant: Keysight Technologies, Inc., Santa Rosa, CA (US)

(72) Inventor: Gregory S. Lee, Mountain View, CA (US)

(73) Assignee: KEYSIGHT TECHNOLOGIES, INC., Santa Rosa, CA (US)

(*) Notice: Subject to any disclaimer, the term of this patent is extended or adjusted under 35 U.S.C. 154(b) by 258 days.

(21) Appl. No.: 17/097,093

(22) Filed: Nov. 13, 2020

(65) Prior Publication Data

US 2021/0405153 A1    Dec. 30, 2021

Related U.S. Application Data

(60) Provisional application No. 63/046,109, filed on Jun. 30, 2020.

(51) Int. Cl.
*G01S 7/40* (2006.01)
*G01S 13/931* (2020.01)

(52) U.S. Cl.
CPC .......... *G01S 7/4008* (2013.01); *G01S 7/4021* (2013.01); *G01S 13/931* (2013.01)

(58) Field of Classification Search
CPC ...... G01S 13/931; G01S 7/025; G01S 7/4008; G01S 7/4021; H01Q 1/3233; H01Q 15/246; H01Q 3/267
See application file for complete search history.

(56) References Cited

U.S. PATENT DOCUMENTS

| 10,126,476 | B2 | 11/2018 | Odes |
| 10,302,830 | B2 | 5/2019 | Suzuki |
| 10,749,265 | B2 | 8/2020 | Quarfoth et al. |
| 2020/0274217 | A1* | 8/2020 | Min ........................ H01P 3/081 |

FOREIGN PATENT DOCUMENTS

| JP | 2633404 B2 | 4/1997 |
| JP | 3751529 B2 | 12/2005 |

OTHER PUBLICATIONS

English translation of abstract for JP3751529B2.
English translation of abstract for JP2633404B2.
Yann Danlee et al., "Flexible twist polarizer based on ultrathin multi-layeredpolymer-carbon nanotubes composite films," Microw Opt Technol Lett. 2017,59, pp. 2844-2848.
Co-related U.S. Appl. No. 16/867,804, filed May 6, 2020.
Co-related U.S. Appl. No. 62/912,442, filed Oct. 8, 2019.

* cited by examiner

*Primary Examiner* — Timothy X Pham

(57) ABSTRACT

A system for testing vehicular radar is described. The system include a free-space polarization adapter (FSPA) configured to alter a first polarization state of electromagnetic waves from a radar device under test (DUT) to a second polarization state, which is different than the first polarization state; and a re-illuminator adapted to receive the electromagnetic waves having the second polarization state from the FSPA.

13 Claims, 4 Drawing Sheets

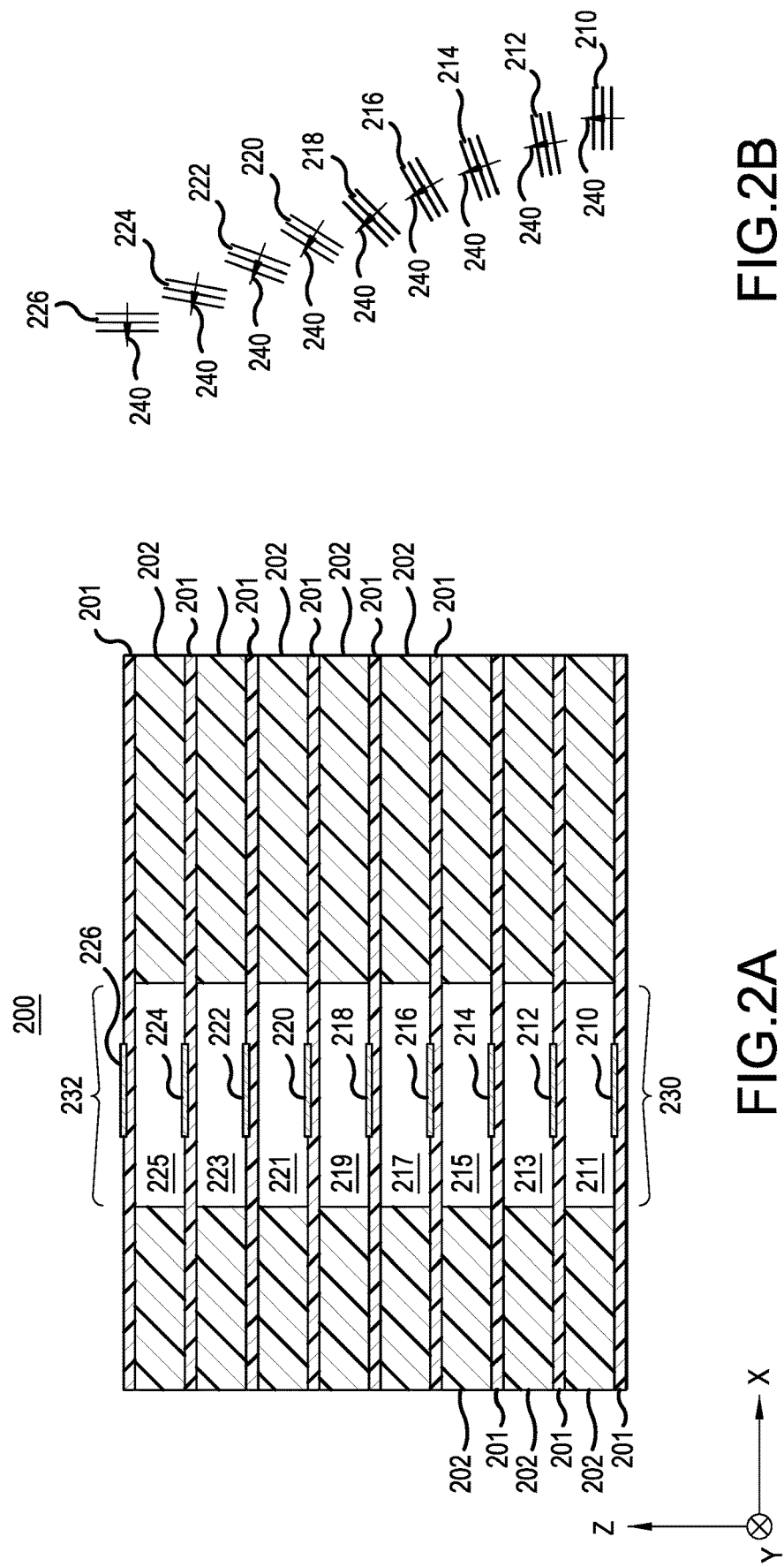

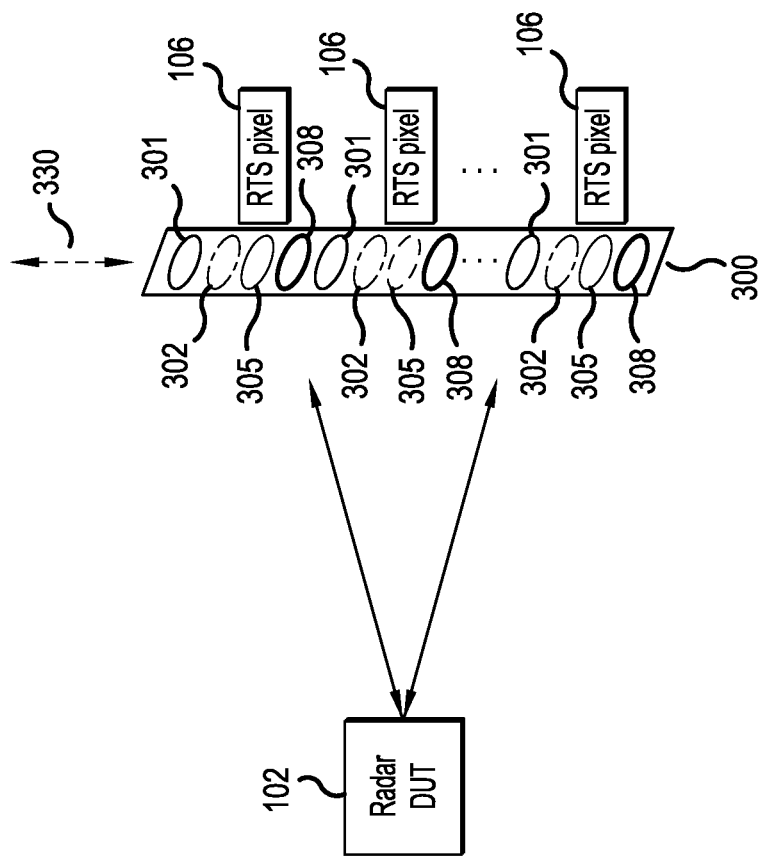
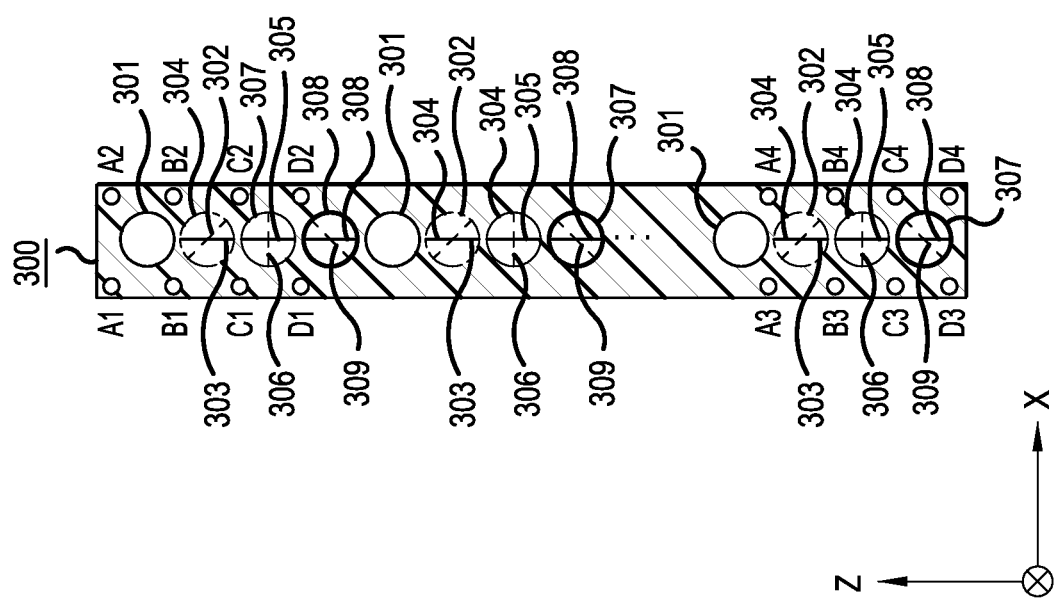
FIG.3B
FIG.3A

FREE-SPACE POLARIZATION ADAPTER

CROSS-REFERENCE TO RELATED APPLICATIONS

This present application is claims priority under 35 U.S.C. § 119(e) from U.S. Provisional Application 63/046,109 filed on Jun. 30, 2020, which names Gregory Lee as inventor. The entire disclosure of U.S. Provisional Application 63/046,109 is specifically incorporated herein by reference.

BACKGROUND

Millimeter waves result from oscillations at frequencies in the frequency spectrum between 30 gigahertz (GHz) and 300 gigahertz. Millimeter wave (mmWave) automotive radar is a key technology for existing advanced driver-assistance systems (ADAS) and for planned autonomous driving systems. For example, millimeter wave automotive radar is used in advanced driver-assistance systems to warn of forward collisions and backward collisions. Additionally, millimeter wave automotive radar may be used in planned autonomous driving systems to implement adaptive cruise control and autonomous parking, and ultimately for autonomous driving on streets and highways. Millimeter wave automotive radar has advantages over other sensor systems in that millimeter wave automotive radar can work under most types of weather and in light and darkness. Adaptation of millimeter wave automotive radar has lowered costs to the point that millimeter wave automotive radar can now be deployed in large volumes. As a result, millimeter wave automotive radars are now widely used for long range, middle range and short range environment sensing in advanced driver-assistance systems. Additionally, millimeter wave automotive radars are likely to be widely used in autonomous driving systems currently being developed.

Actual driving environments in which automotive radars may be deployed can vary greatly and many such driving environments may be complex. For example, actual driving environments may contain numerous objects, and some objects encountered in actual driving environments have complicated reflection and diffraction characteristics that affect echo signals. The immediate consequences of incorrectly sensing and/or interpreting echo signals may be that false warnings or improper reactions are triggered or warnings or reactions that should be triggered are not, which in turn can lead to accidents.

Consequently, auto manufacturers and the automotive radar manufacturers are eager to electronically emulate driving conditions to provide automotive radar systems with optimally accurate performance.

Single-target radar emulators are known. As the desire for improved vehicle radars increases, such as for advanced "intelligent" purposes like autonomous driving, there is a pressing need to test the radar devices and confirm that their accuracy of locating and/or recognizing the plethora of targets present in real-world driving situations. However, emulating an actual driving scenario, however, necessitates emulating multiple targets. Often, the output of the radar of a device under test comprises single-polarized electromagnetic radiation. However, there is no standard or consensus about polarization, so different manufacturers choose different polarizations. The only commonality is that linear polarization is used and not circular polarization, because the latter changes handedness upon reflection from targets. However, linear polarization still allows the freedom to choose between, e.g., vertical, horizontal, 45°, and −45°.

This variation in the polarization state of the radar device under test (DUT) from different manufacturers requires testing equipment to accommodate for the different input polarization states. Using known equipment, this accommodation is prohibitively expensive, and often complicated.

What is needed, therefore, is a system for testing radar devices used to emulate multiple targets encountered by a radar system that overcomes at least the drawbacks of the known radar emulators described above.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

FIG. 2A is a cross-sectional view of a free-space polarization adaptor in accordance with a representative embodiment.

FIG. 2B shows arrangements of wires at each space in the x-y plane of the coordinate system of FIG. 2A in accordance with a representative embodiment.

FIG. 3A is an end view of an FSPA comprises a plurality of elements each disposed on a curtain strip in accordance with a representative embodiment.

FIG. 3B is a simplified conceptual view of a showing system for testing vehicular radar in accordance with a representative embodiment.

DETAILED DESCRIPTION

Figure 1:
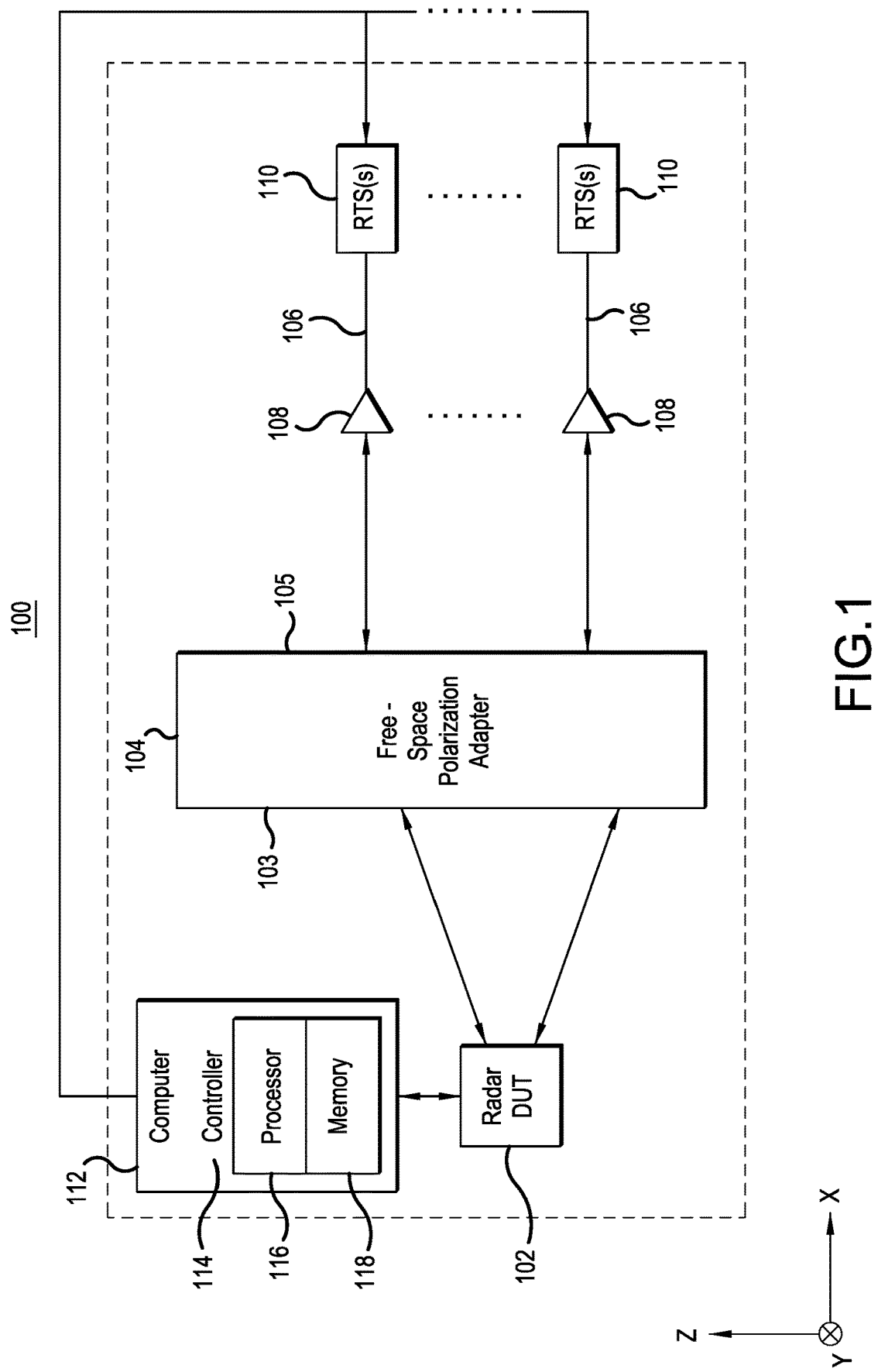
FIG. 1 is a simplified block diagram showing system for testing vehicular radar in accordance with a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms 'a', 'an' and 'the' are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", or "coupled to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

As described herein in connection with various representative embodiments, a system for testing vehicular radar is disclosed. The system comprises: a free-space polarization adapter (FSPA) configured to alter a first polarization state of electromagnetic waves from a radar device under test (DUT) to a second polarization state, which is different than the first polarization state; and a re-illuminator adapted to receive the electromagnetic waves having the second polarization state from the FSPA.

As described herein in connection with various representative embodiments, a free-space polarization adapter (FSPA) is described. The FSPA is configured to alter a first polarization state of electromagnetic waves to a second polarization state, which is different than the first polarization state. The FSPA comprises: a stack of spacer layers disposed over one another; an space in each of the spacer layers; a support membrane extending across each of the spaces; and sets of wires disposed over the each of the support membranes, with one set of wires disposed in each space. Each set of wires is adapted to alter a polarization state of electromagnetic waves to another polarization state.

As described herein in connection with various representative embodiments, a free-space polarization adapter (FSPA) comprises: a curtain strip comprising a plurality of elements adapted to alter a first polarization state of electromagnetic waves to a second polarization state that is different than the first polarization state. Each of the plurality of elements comprises: a stack of spacer layers disposed over one another; an space between each of the spacer layers; a support membrane extending across each of the spaces; and sets of wires disposed over the each of the support membranes, with one set of wires disposed in each space, wherein each set of wires is adapted to alter a polarization state of electromagnetic waves to another polarization state.

FIG. 1 is a simplified block diagram showing system 100 for testing vehicular radar in accordance with a representative embodiment. As will be appreciated by one of ordinary skill in the art having the benefit of the present disclosure, one likely vehicular radar is an automobile radar that is used in various capacities in current and emerging automobile applications. However, it is emphasized that the presently described system 100 for testing vehicular radar is not limited to automobile radar systems, and can be applied to other types of vehicles including busses, motorcycles, motorized bicycles (e.g., scooters), and other vehicles that could employ a vehicular radar system. In accordance with a representative embodiment, the system 100 is arranged to test a radar device under test (DUT) 102, and comprises a free-space polarization adapter (FSPA) 104, and a plurality of re-illuminators 106. Each of the re-illuminators 106 comprises a re-illuminator antenna 108 and a radar target simulator (RTS) 110. In accordance with a representative embodiment, a plurality of the re-illuminators 106 may be arranged in a 2-D array, where each re-illuminator 106 represents a pixel in the 2-D array. In this case, the pixels, which may be referred to as RTS pixels herein, have spatial positions corresponding to target angles.

Various aspects of the RTS 110 are described in commonly owned U.S. patent application Ser. No. 16/867,804; and commonly-owned U.S. Provisional Application No. 62/912,442 both naming Gregory Lee inventor. The entire disclosures of U.S. patent application Ser. No. 16/867,804 and U.S. Provisional Application No. 62/912,442 are specifically incorporated herein by reference. Notably, in U.S. patent application Ser. No. 16/867,804 and U.S. Provisional Application No. 62/912,442 the RTSs 110 are referred to as "Modulated Reflection Device (MRD)." Furthermore, as noted in these referenced applications, and as described more fully below, there is one RTS 110 for each emulated target.

As will become clearer as the present description continues, the FSPA 104 may comprise a single structure comprising a plurality of elements, and adapted to change the polarization state incident on each of the RTSs 110, or may comprises a plurality of structures, each of which comprise a plurality of elements, and each of which is adapted to change the polarization state incident on a specific one of the RTSs 110.

The system also comprises a computer 112. In various embodiments, the computer 112 may include one or more computer processors (e.g., processor 118), digital signal processors (DSP), field-programmable gate arrays (FPGAs), application specific integrated circuits (ASICs), or combinations thereof, using any combination of hardware, software, firmware, hard-wired logic circuits, or combinations thereof. The computer 112 and/or the controller 114 may include its own processing memory (e.g., memory 116) for storing computer readable code (e.g., software, software modules) that enables performance of the various functions described herein. For example, the processing memory may store software instructions/computer readable code executable by a processor 118 for performing some or all aspects of embodiments described herein. That is, execution of the instructions/computer readable code generally causes the processor 118 of the computer 112 and/or the controller 114 to emulate echo signals reflected from emulated radar targets in response to the PMCW signals transmitted by the radar DUT 102. Memories (and databases) as described herein may be RAM, ROM, flash memory, an electrically programmable read-only memory (EPROM), an electrically erasable and programmable read only memory (EEPROM), registers, a hard disk, a removable disk, tape, compact disk read only memory (CD-ROM), digital versatile disk (DVD), registers, a hard disk, a removable disk, tape, floppy disk, Blu-ray disk, or universal serial bus (USB) driver, or any other form of storage medium known in the art, which are tangible and non-transitory computer readable storage media (e.g., as compared to transitory propagating signals). Memories may be volatile or non-volatile, secure and/or encrypted, unsecure and/or unencrypted, without departing from the scope of the present teachings.

The controller 114 may include a combination of memory 116 that stores instructions, and the processor 118 that executes the instructions in order to implement processes described herein. The controller 114 may be housed within or linked to a workstation such as the computer 112 or another assembly of one or more computing devices, a display/monitor, and one or more input devices (e.g., a keyboard, joysticks and mouse) in the form of a standalone computing system, a client computer of a server system, a desktop or a tablet. The term "controller" broadly encompasses all structural configurations, as understood in the art of the present disclosure and as exemplarily described in the present disclosure, of an application specific main board or an application specific integrated circuit for controlling an application of various principles as described in the present disclosure. The structural configuration of the controller may include, but is not limited to, processor(s), computer-usable/computer readable storage medium(s), an operating system, application module(s), peripheral device controller (s), slot(s) and port(s).

Additionally, although the computer 112 shows components networked together, two such components may be integrated into a single system. For example, the computer 112 may be integrated with a display (not shown) and/or with the system 100. That is, in some embodiments, functionality attributed to the computer 112 may be implemented by (e.g., performed by) the system 100. On the other hand, the networked components of the computer 112 may also be spatially distributed such as by being distributed in different rooms or different buildings, in which case the networked components may be connected via data connections. In still another embodiment, one or more of the components of the computer 112 is not connected to the other components via a data connection, and instead is provided with input or output manually such as by a memory stick or other form of memory. In yet another embodiment, functionality described herein may be performed based on functionality of the elements of the computer 112 but outside the system 100.

While the various components of the system 100 are described in greater detail in connection with representative embodiments below, a brief description of the function of the system 100 is presented currently.

In operation, the radar DUT 102 emits signals (illustratively mm wave signals) that are incident on a first side 103 of the FSPA 104. As described more fully herein, the signals from the DUT have a certain linear polarization state. As described more fully below, the FSPA 104 is configured to provide at a second side 105 a desired polarization state useful in emulating by the re-illuminators 106. Just by way of example, if the radar signals from the radar DUT 102 were linearly polarized along the z-axis in the coordinate system shown, and the re-illuminators 106 are adapted to process radar signals having a polarization state along the x-axis in the coordinate system shown, and thus is not compatible with the polarization state output from the radar DUT 102. As described more fully below, the FSPA 104 is adapted to rotate a first linear polarization signal from the radar DUT 102 incident on its first side 103 to a second linear polarization state at its second side 105 that is compatible to the polarization state used by the re-illuminators 106. So, continuing this example, when the radar DUT 102 provides radar signals in a first linear polarization state oriented along the z-axis of the coordinate system shown to the first side 103, the FSPA 104 rotates the incident radar signals 90° to a second linear polarization state oriented along the x-axis of the coordinate system shown.

Again, each of the signals diffracted by the FSPA 104 is incident on a respective one of the re-illuminator antenna 108 of the re-illuminators 106. The signals incident on the re-illuminator antennae 108 are provided to a respective one of the RTSs 110. As described more fully herein, based on input from the controller, frequency modulation of the incident signals is effected in each of the MRDs and beneficially emulates a distance of a target from the radar DUT 102, or a velocity of a target relative to the radar DUT 102, or both. Moreover, and again as described more fully herein, the azimuth (±x-direction in the coordinate system of FIG. 1) and the elevation (±z direction in the coordinate system of FIG. 1) are emulated by the re-illuminator antennae 108, which are illustratively mechanically gimballed, or a combination of mechanical gimballing and electronic emulation.

The re-illuminated signals are incident on the second side 105 of the FSPA 104, where their polarization state is rotated back to be compatible with the radar DUT 102. So, continuing the previous example, the re-illuminators 106 provide radar signals in the second linear polarization state (oriented along the x-axis of the coordinate system shown) to the second side 105, and the FSPA 104 rotates the incident radar signals 90° to the first linear polarization state (oriented along the x-axis of the coordinate system shown) for reception by the radar DUT 102.

FIG. 2A is a cross-sectional view of a free-space polarization adaptor (FSPA) 200 in accordance with a representative embodiment. Various aspects of the FSPA 200 and its implementation are common to those described in connection with the representative embodiments described in connection with FIG. 1 above. Details of these common aspects are not necessarily repeated in the description of the representative embodiments described in connection with FIG. 2A, but nonetheless may be germane to the presently described embodiments.

The FSPA 200 comprises a stack of alternating support membrane layers 201 and spacer layers 202. As will become clearer as the present description continues, the support membrane layers 201 have a comparatively low dielectric constant (e.g., <3.5 at millimeter-wave frequencies), are comparatively low loss (e.g., having a loss tangent δ<0.01), and comparatively great enough strength to prevent the support membrane layers 201 from tearing even in ultrathin (z-direction in the coordinate system of FIG. 2A) sheet form. In accordance with a representative embodiment, the support membrane layers 201 are made of comparatively low-loss radio frequency (RF) materials, and may be made of, for example, Kapton Teflon, Mylar, Tachyon 100G, Getek and Megtron 6 (with copper wires as discussed below). Depending on the material selected for use as the support membrane layers 201, these layers have a thickness in the range of approximately 0.25 mils to approximately 3.0 mils.

The spacer layers 202 are disposed with substantially uniform spacing (z-direction in the coordinate system of FIG. 2A) of a fraction of a free-space wavelength. For example, at 77 GHz the wavelength is about 3.9 mm, and each spacer might be ~0.15 mm to 0.5 mm thick (again in the z-direction). The spacer can be made of one of a variety of materials in view of the spaces (described below) that functions as low-loss radiation windows through which the electromagnetic radiation traverse across encounter the polarizing wires (discussed below). Illustratively, the spacer layers 202 may be made of FR-4 because many printed circuit boards (PCB) and flex circuit vendors already laminate it with Kapton, which can be used to form the support membrane layers 201 as noted above.

A first set of wires 210 is disposed over support membrane layer 201 as shown. A first space 211 is provided by removing a portion of the spacer layer 202 at that level of the stack.

A second set of wires 212 is disposed over support membrane layer 201 as shown. A second space 213 is provided by removing a portion of the spacer layer 202 at that level of the stack.

A third set of wires 214 is disposed over support membrane layer 201 as shown. A third space 215 is provided by removing a portion of the spacer layer 202 at that level of the stack.

A fourth set of wires 216 is disposed over support membrane layer 201 as shown. A fourth space 217 is provided by removing a portion of the spacer layer 202 at that level of the stack.

A fifth set of wires 218 is disposed over support membrane layer 201 as shown. A fifth space 219 is provided by removing a portion of the spacer layer 202 at that level of the stack.

A sixth set of wires 220 is disposed over support membrane layer 201 as shown. A sixth space 221 is provided by removing a portion of the spacer layer 202 at that level of the stack.

A seventh set of wires 222 is disposed over support membrane layer 201 as shown. A seventh space 223 is provided by removing a portion of the spacer layer 202 at that level of the stack.

An eighth set of wires 224 is disposed over support membrane layer 201 as shown. An eighth space 225 is provided by removing a portion of the spacer layer 202 at that level of the stack.

A ninth set of wires 226 is disposed over support membrane layer 201 as shown.

Notably, the use of nine sets of wires in the FSPA 200 is merely illustrative, and more or fewer sets of wires may be used to form the FSPA 200. As noted below, a trade-off between the cost of more sets of wires and the increased losses that can result in fewer sets of wires in the stack that comprises the FSPA 200 must be considered when determining the number of sets of wires, and number of layers in the stack.

As described more fully in connection with representative embodiments of FIG. 2B, the FSPA 200 is adapted to have electromagnetic radiation in a first polarization state incident on a first opening 230 on a first side 203, traverse the first through ninth sets of wires 210~226 disposed in the first through eighth spaces 211~225, each of which comprises air, and emerge on from a second opening 232 on a second side 205 and have a second polarization state that is different than the first polarization state. Similarly, the FSPA 200 is adapted to have electromagnetic radiation in a first polarization state incident on the second side 205, traverse the first through ninth sets of wires 210~226 disposed in the first through eight sets of spaces 211~225 and emerge on the first side 203 having the second polarization state that is different than the first polarization state.

FIG. 2B shows arrangements of the first through ninth sets of wires 210~226 at a respective one of the first through eight spaces 211~225 in the x-y plane of the coordinate system of FIG. 2A in accordance with a representative embodiment.

Each of the first through nine sets of wires 210~226 forms a wire grid polarizer. Electromagnetic waves that have a component of their electric fields aligned parallel to the wires of the first through ninth sets of wires 210~226 will induce the movement of electrons along the length of the wires. Since the electrons are free to move in this direction, the wire grid polarizers behave in a similar manner to the surface of a metal when reflecting light, and the wave is reflected backwards along the incident beam (minus a small amount of energy lost to Joule heating of the wire).

For waves with electric fields perpendicular to the wires, the electrons cannot move very far across the width of each wire. Therefore, little energy is reflected and the incident wave is able to pass through the wire grid. In this case the grid behaves like a dielectric material. As such, incoming electromagnetic waves that have a polarization state perpendicular to the direction of the wire grid polarizers comprises of the first through ninth sets of wires 210~226 is transmitted. Overall, this causes the wave transmitted by each of the first through ninth sets of wires 210~226 to be linearly polarized with an electric field vector completely perpendicular to a respective one of the first through ninth sets of wires 210~226. As such, arrows 240, which show the orientation of the electric field vector (and thus the polarization state) transmitted by each of the first through ninth sets of wires 210~226—in each case the electric field is perpendicular to the arrow at each of the first through ninth sets of wires 210~226.

As shown in FIG. 2B, and as alluded to above, radar waves that are transmitted by the ninth set of wires 226 have electric field vectors that are perpendicular to the radar waves incident on the first set of wires 210. As such, in this illustration, the first through ninth sets of wires 210~226 incrementally "twist" the orientation of the electric field vectors (indicative of the polarization state) so that the resultant transmitted electric field vector is orthogonal to the incident electric field vector indicative of its linear polarization state. As such, radar waves from the radar DUT 102 that are incident at first opening 230 having a first polarization state emerge from the second opening 232 having a second polarization state that is different from the first polarization state (in this case orthogonal to the first polarization state). Of course, the reverse is also true-radar waves incident from the radar DUT 102 on the second opening 232 at the ninth set of wires 226 having a first polarization state emerge from the first opening 230 having a second polarization state that is different from the first polarization state (in this case orthogonal to the first polarization state).

Moreover, and as can be appreciated from a review of FIG. 2B, rotation of the incident polarization state at the first opening 230 relative to the transmitted polarization state from the second opening 232 can be tailored by the selection of the orientation of the first set of wires 210 relative to the ninth set of wires 226. That is, the first set of wires 210 may be oriented to that incident radar signals from the radar DUT 102 having a first polarization state. By selecting the orientation of the ninth set of wires 226 relative to the first set of wires, the transmitted radar signals emerging from the second opening 232 have a second polarization state that is different from the first polarization state of the radar waves from the radar DUT 102 that are incident on the first opening 230.

In accordance with a representative embodiment, tach set of the first through ninth sets of wires 210~226 is successively rotated relative to the previous set of wires by an amount determined based on a desired level of loss. To this end, the smaller the incremental change in orientation between each successive set of wires of the FSPA 200, the finer is the change in the orientation of the electric field vector at each successive set of wires. By contrast, the courser the incremental change in orientation of the electric field vector between each successive set of wires of the FSPA 200, the larger is the change in the orientation of the electric field vector at each set of wires. As will be appreciated the finer the change in the orientation of the electric field vector between each successive set of wires of the FSPA 200, the lower the loss in power across the FSPA 200; and the courser the change in the orientation of the electric field vector between each successive set of wires of the FSPA 200, the greater is the loss in power across the FSPA 200. While comparatively small changes in the orientation of the successive sets of wires in the FSPA (e.g., 1° difference between each successive set of wires) are desirable, it must be weighed against the cost of manufacture. Continuing the earlier example, if the orientation between each successive set of wires were 1°, the number of sets of wires (and the number of layers of the stack comprising the FSPA 200) required between the first opening 230 and the second opening 232 to achieve a 90° polarization rotation would be 90. While possible, this degree of change may be fiscally impractical.

By way of illustration a reasonable compromise between the level of power transmitted between the first opening 230 and the second opening 232 and the cost of the FSPA 200, a change in the orientation between each successive set of wires is in the range of approximately 5° to approximately 10°. To this end, suppose α is the incremental change in angle of orientation of the wires between each successive set of the first through ninth sets of wires 210~226. Each set of wires transmits the new, slightly "twisted" polarization by the factor $\cos^2(\alpha)$ and rejects/reflects by the factor $\sin^2(\alpha)$. As such, rotating the polarization state of the electromagnetic signal from the radar DUT 102 incident on the FSPA 200 (e.g., on first opening 230) by 90° upon transmission from the FSPA (e.g., from second opening 232) using nine layers as shown (i.e. α=10°) provides a net transmission factor of $\cos^{(2*9)}(10°)$=0.76 or about −1.2 dB.

Beneficially, the polarization state of the transmitted electromagnetic wave is adiabatically rotated to be perpendicular to the sets of wires (e.g., first through ninth sets of wires 210~226) at each level of the stack that comprises the FSPA 200. As such, by providing between five and nine sets of wires across the stack that comprises the FSPA 200, the difference between a first polarization state incident from the radar DUT 102 on the first opening 230 (or, on the second opening 232 from the re-illuminators 206 in the return trip) is rotated to provide second polarization state to the re-illuminators 206 that is, for example, ±45° or 90° relative to first polarization state, depending on the successive twist increment. As will be appreciated, therefor, by the present teachings, a desired (i.e., tailored) degree of rotation between a first polarization state and a second polarization state may be selected by the selection of the change in the orientation between each successive set of wires that make up the FSPA 200, and the number of sets of wires that make up the FSPA 200. It is noted that the number of wires (3) for each set of the first through ninth sets of wires 210~226 are shown in FIG. 2B is merely to illustrate the orientation. More generally, each set of first through ninth sets of wires 210~226 have a desired density (i.e., number of wires per unit width). To this end, for a given density then, the number of wires per set is proportional to the diameter of a first opening 230 and a second opening 232. The density should be greater than or equal to one wire every quarter of a free space wavelength (λ/4). On the other hand, observing a practical limit of approximately one wire every 5 mils is prudent in order to maintain printed circuit manufacturability.

In accordance with an illustrative embodiment, each of the wires of the first through ninth sets of wires 210~226 is made from an electrically conductive material (e.g., metal or metal alloy) selected to provide sufficient conductivity to efficiently effect rotation of the polarization state of the electric vector traversing the wires. By way of example, the wires are made of copper, and the stack that makes up the FSPA 200 comprises laminated layers (wire/support membrane layer 201/spacer layer 202 with spaces 211~225) comprising Cu-Kapton/FR-4/Cu-Kapton/FR-4/ . . . /Cu-Kapton.

The separation between wires that comprise the first through ninth sets of wires 210~226 must be less than the wavelength of the incident radiation. In addition, the width of each wire (x-direction in the coordinate system of FIG. 2A) that make up the first through ninth sets of wires 210~226 should be small compared to the spacing between wires. In accordance with a representative embodiment, depending on the wavelength of the electromagnetic signals from the radar DUT 102, the wires of each of the first through ninth sets of wires 210~226 have a thickness (z-direction in the coordinate system of FIG. 2A) in the range of approximately 1.0 µm to approximately 25 µm, and a width (x-direction in the coordinate system of FIG. 2A or y-direction if the particular wire set has reached 90° of accumulated rotation) in the range of approximately 10 µm to approximately 250 µm. Notably, for the wavelengths contemplated by the present teachings, the wire-grid polarizers made up of the first through ninth sets of wires 210~226 can be readily fabricated using known lithographic techniques having suitable dimensions and comparatively tight pitch.

FIG. 3A is an end view of an FSPA 300 comprises a plurality of elements each disposed on a curtain strip in accordance with a representative embodiment. Various aspects of the FSPA 300 and its implementation are common to those described in connection with the representative embodiments described in connection with FIGS. 1-2B above. Details of these common aspects are not necessarily repeated in the description of the representative embodiments described in connection with FIG. 3A.

The FSPA 300 comprises a curtain strip comprising a plurality of elements for selective alteration of the input polarization state. In particular, each "element" comprises a stack that forms one FSPA 200. As such, there are four (4) FSPAs 200 in the FSPA 300. Moreover, each element shows orientation of the first sets of wires (e.g., first set of wires 210 in FIG. 2B), which are distinguished by dashed lines at the first opening 230; and the last set of wires (e.g., ninth set of wires 226) at the second opening 232. For ease of description the sets of wires (e.g., second through eighth sets of wires 212~224) are not shown in FIG. 3A.

The curtain strip that forms the FSPA 300 comprises first openings 301, 302, 305 and 308. First opening 301 has no wires therein. Notably, the first opening is aligned between the radar DUT 102 and one (or more) re-illuminator 106 when there is no need to alter the polarization state of the electromagnetic signals from the radar DUT 102.

First opening 302 comprises a first set of wires 303 oriented at 135° and a last set of wires 304 oriented at 90°. As such, electromagnetic signals from the radar DUT 102 having a linear polarization state (E-field vector) perpendicular to the first set of wires 303 will emerge from the second opening having a linear polarization state that is perpendicular to the last set of wires 304. Accordingly, the first element comprising the first opening 302, first set of wires 303 and last set of wires 304 will rotate the linearly polarized light from the radar DUT 102 45° in the counter-clockwise direction. Moreover, and as noted above, linearly polarized electromagnetic signals sent back to the radar DUT 102 from the re-illuminator(s) 106 is rotated −45° by the last set of wires 304 to be perpendicular to the first set of wires 303 and received at the radar DUT 102.

First opening 305 comprises a first set of wires 306 oriented at 180° and a last set of wires 304 oriented at 45°. As such, electromagnetic signals from the radar DUT 102 having a linear polarization state (E-field vector) perpendicular to the first set of wires 306 will emerge from the second opening having a linear polarization state that is perpendicular to the last set of wires 307. Accordingly, the first element comprising the first opening 305, first set of wires 306 and last set of wires 307 will rotate the linearly polarized light from the radar DUT 102 +45° in the clockwise direction. Moreover, and as noted above, linearly polarized electromagnetic signals sent back to the radar DUT 102 from the re-illuminator(s) 106 is rotated −45° by the last set of wires 307 to be perpendicular to the first set of wires 306 and received at the radar DUT 102.

First opening 308 comprises a first set of wires 309 oriented at 45° and a last set of wires 310 oriented at 90°. As such, electromagnetic signals from the radar DUT 102 having a linear polarization state (E-field vector) perpendicular to the first set of wires 309 will emerge from the second opening having a linear polarization state that is perpendicular to the last set of wires 310. Accordingly, the first element comprising the first opening, first set of wires 303 and last set of wires 304 will rotate the linearly polarized light from the radar DUT 102 +45° in the clockwise direction. Moreover, and as noted above, linearly polarized electromagnetic signals sent back to the radar DUT 102 from the re-illuminator(s) 106 is rotated −45° by the last set of wires 307 to be perpendicular to the first set of wires 306 and received at the radar DUT 102.

As shown, the sequence of elements, having first openings 301, 302, 305 and 308 and respective first and last sets of wires oriented as described above, repeat along the length of the curtain strip that forms the FSPA 300. Providing this arrangement allows the user to select the desired rotation of incident linearly polarized electromagnetic signals by aligning a desired one the elements comprising first openings 301, 302, 305 and 308 between the radar DUT 102 and the re-illuminator(s) 106. As such, linearly polarized electromagnetic signals from the radar DUT 102 incident on the selected first set of wires 303, 306, 309 are rotated for reception by the re-illuminator(s) 106 by the respective last set of wires 304, 307 and 310; and be rotated again in the opposite direction from the re-illuminator(s) 106 for reception at the radar DUT 102. Of course, aligning the first opening 301 between the radar DUT 102 and the re-illuminator(s) 106 results in no rotation of linearly polarized electromagnetic signals from either the radar DUT 102 or the re-illuminator(s) 106.

Finally, and as can be appreciated from a review of FIG. 3A, holes A1~D4 are used to align the desired element of the FSPA 300 to exact the desired rotation of the linearly polarized electromagnetic signals from the radar DUT 102 to the re-illuminator(s) 106, and reverse the rotation of linearly polarized electromagnetic signals from the re-illuminator(s) 106 to the radar DUT 102.

FIG. 3B is a simplified conceptual view of a showing system for testing vehicular radar in accordance with a representative embodiment. Various aspects of the FSPA 300 and its implementation are common to those described in connection with the representative embodiments described in connection with FIGS. 1-3A above. Details of these common aspects are not necessarily repeated in the description of the representative embodiments described in connection with FIG. 3B, but nonetheless may be germane to the presently described embodiments.

FIG. 3B shows the FSPA 300 comprising the plurality of elements in a curtain strip as described above. The FSPA 300 is disposed between radar DUT 102 and re-illuminators 106. As noted above, in accordance with a representative embodiment, a plurality of the re-illuminators 106 may be arranged in a 2-D array, where each re-illuminator 106 represents a pixel in the 2-D array. In this case, the pixels, which may be referred to as RTS pixels herein (see FIG. 3B), have spatial positions corresponding to target angles.

As shown, the first openings 301, 302, 305 and 308 are disposed along the curtain strip and are adapted to be moved up/down as shown by arrows 330. In operation, the desired rotation of linearly polarized electromagnetic radiation is effected by aligning the needed first opening 301, 302, 305 and 308 between the radar DUT 102 and re-illuminators 106. In FIG. 3B, first opening 305 is shown to be so aligned.

As shown in FIG. 3B, when a radar DUT is tested with a different polarization from the radar previous DUT, curtain strip is shifted along arrows 330 so that the relevant first opening 301, 302, 305 and 308 mates to each re-illuminator antenna 108.

For example, suppose the re-illuminator antennae 108 are designed for horizontal polarization. The curtain strip has first opening 301 that does not include sets of wires, but rather has holes drilled through the entire laminate stack. Another radar DUT 102 may have test antennas that provide vertical polarization. In this case, the curtain is moved (along arrows 330) so the first openings 305 are aligned to be between the radar DUT 102 and the re-illuminator antennae 108. In another instance it may be required to rotate linearly polarized electromagnetic signals from the radar DUT 102 by +45° polarization. In this case curtain is moved (along arrows 330) so the first openings 308 are aligned to be between the radar DUT 102 and the re-illuminator antennae 108. Finally, it may be required to rotate linearly polarized electromagnetic signals from the radar DUT 102 by −45° polarization. In this case curtain is moved (along arrows 330) so the first openings 302 are aligned to be between the radar DUT 102 and the re-illuminator antennae 108. Sets of different PCB mounting holes (A1-D4 in FIG. 3A) on the curtain strip allow for a quick remount shift—an entire column of RTS's are then adapted to the new radar all at once. The particular geometry of mounting holes illustrated in FIG. 2 is simply an example; there are many alternate mounting geometries that accomplish the same result.

Figure 4:
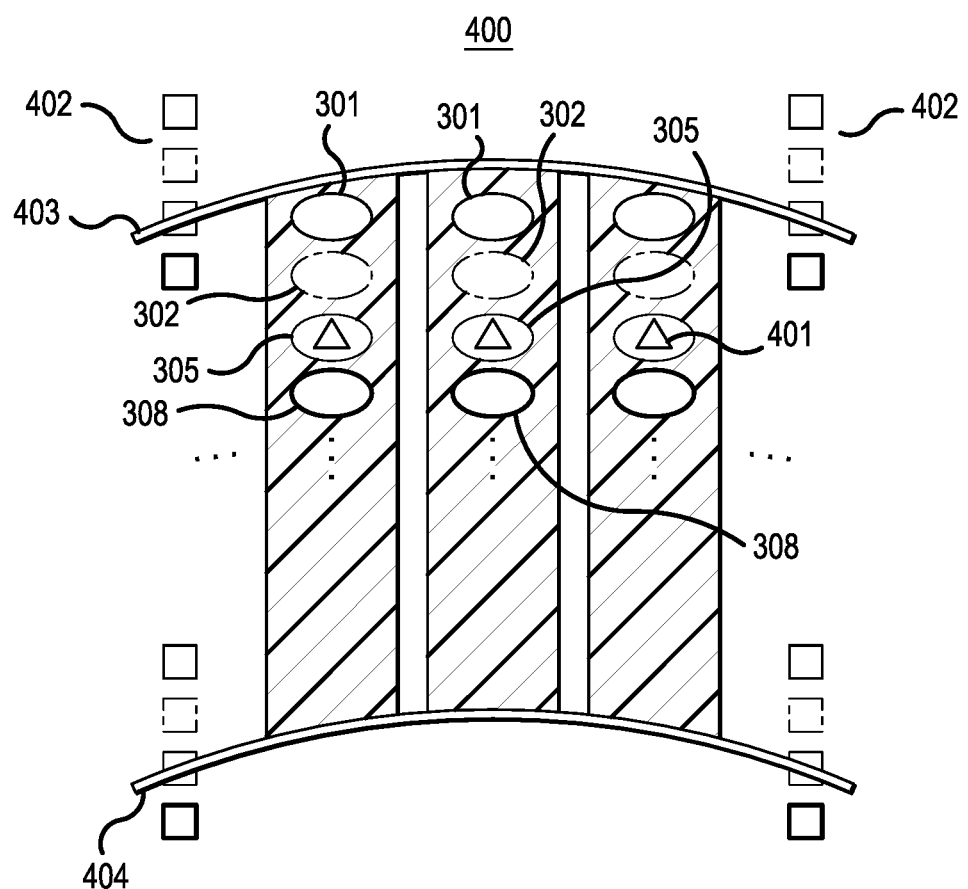
FIG. 4 is an end view of an FSPA comprising a plurality of curtain strips, each comprising a plurality of elements in accordance with a representative embodiment.

FIG. 4 is an end view of an FSPA 400 comprising a plurality of curtain strips, each comprising a plurality of elements in accordance with a representative embodiment. Various aspects of the FSPA 400 and its implementation are common to those described in connection with the representative embodiments described in connection with FIGS. 1-3B above. Details of these common aspects are not necessarily repeated in the description of the representative embodiments described in connection with FIG. 4A.

The FSPA 400 comprises a plurality of FSPA's 300 disposed between a radar DUT (not shown in FIG. 4) and plurality of the re-illuminators 106 (RTS pixels) may be arranged in a 2-D array, have spatial positions corresponding to target angles. Notably, the 2D array of re-illuminators 106 is disposed "behind" FSPA 400 in FIG. 4.

In the illustrative embodiment, first openings 305 of each of the FSPAs 300 are aligned with re-illuminators 106 to ensure proper rotation of the incident linearly polarized light from the radar DUT. This alignment is symbolically shown by a triangle disposed in the first openings. As will be appreciated, aligning of another of the first openings 301, 302, 305 and 308 to effect another desired rotation of linearly polarized electromagnetic radiation from a radar DUT to match that of the re-illuminators may be carried out by moving a first suspension rod 403 and second suspension rod 404 to be suspended by the respective opening 402 as shown.

While 2D arrays of illuminators are useful, in certain applications a quasi-cylindrical array of re-illuminators 106 in which adjacent columns are not coplanar to each other is contemplated. The cylindrical arrangement is more favorable for representing a wide field of view (FOV) to the radar DUT without compromising sensitivity toward targets that are not directly in front of the radar DUT. As such, first and second suspension rods 403, 404 mechanically link the FSPAs 300 together so that by raising and lowering the first and second suspension rods 403, 404 to achieve the same result of re-adapting the entire system with one action.

In view of the foregoing, the present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

Although various target emulations for automobile radar systems have been described with reference to several representative embodiments, it is understood that the words that have been used are words of description and illustration, rather than words of limitation. Changes may be made within the purview of the appended claims, as presently stated and as amended, without departing from the scope and spirit of dynamic echo signal emulation for automobile radar sensor configurations in its aspects. Although dynamic echo signal emulation for automobile radar sensor configurations has been described with reference to particular means, materials and embodiments, dynamic echo signal emulation for automobile radar sensor configurations is not intended to be limited to the particulars disclosed; rather dynamic echo signal emulation for automobile radar sensor configurations extends to all functionally equivalent structures, methods, and uses such as are within the scope of the appended claims.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "teachings" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

The invention claimed is:

1. A free-space polarization adapter (FSPA) configured to alter a first polarization state of electromagnetic waves to a second polarization state, which is different than the first polarization state, the FSPA comprising:
   a stack of spacer layers disposed over one another;
   a space in between each of the spacer layers;
   a support membrane extending across each of the spaces; and
   sets of wires disposed over the each of the support membranes, with one set of wires disposed in each space, wherein each set of wires is adapted to alter a linear polarization state of electromagnetic waves to another linear polarization state.

2. The FSPA of claim 1, wherein electromagnetic radiation incident on a first one of the spaces has a first linear polarization state, and emerges from a last one of the spaces in a second linear polarization state, which is different than the first polarization state.

3. The FSPA of claim 2, wherein the second linear polarization state is shifted by 90° compared to the first linear polarization state.

4. The FSPA of claim 2, wherein the second polarization state is shifted by ±45° compared to the first linear polarization state.

5. The FSPA of claim 2, wherein the second linear polarization state is shifted by ±45° relative to the first polarization state.

6. The FSPA of claim 2, wherein the curtain strip is adapted to be moved to align one of the plurality of elements with an output from a DUT.

7. The FSPA of claim 6, wherein the plurality of curtain strips are disposed adjacent to one another.

8. The FSPA of claim 7, wherein the first rod and the second rod are adapted to move the plurality of curtain strips so that a desired one of the plurality of elements to align one of the plurality of elements of each of the plurality of curtain strips with an output from a DUT.

9. The FSPA of claim 2, further comprising:
a plurality of curtain strips, each comprising a plurality of elements adapted to alter a first linear polarization state of electromagnetic waves to a second linear polarization state that is different than the first linear polarization state, wherein each of the plurality of elements comprises:
a stack of spacer layers disposed over one another;
a space between each of the spacer layers;
a support membrane extending across each of the spaces; and
sets of wires disposed over the each of the support membranes, with one set of wires disposed in each space, wherein each set of wires is adapted to alter a linear polarization state of electromagnetic waves to another linear polarization state.

10. The FSPA of claim 9, wherein the plurality of curtain strips is suspended between a first rod and a second rod.

11. A free-space polarization adapter (FSPA), comprising:
a curtain strip comprising a plurality of elements adapted to alter a first linear polarization state of electromagnetic waves to a second linear polarization state that is different than the first linear polarization state, wherein each of the plurality of elements comprises:
a stack of spacer layers disposed over one another;
a space between each of the spacer layers;
a support membrane extending across each of the spaces; and
sets of wires disposed over the each of the support membranes, with one set of wires disposed in each space, wherein each set of wires is adapted to alter a linear polarization state of electromagnetic waves to another linear polarization state.

12. The FSPA of claim 11, wherein electromagnetic waves incident on a first one of the spaces has a first linear polarization state, and emerges from a last one of the spaces in a second linear polarization state, which is different than the first linear polarization state.

13. The FSPA of claim 12, wherein the second linear polarization state is shifted by 90° relative to the first linear polarization state.

* * * * *